July 13, 1954  V. J. SIGODA  2,683,488
EMBROIDERY TRIMMING MACHINE
Filed Feb. 16, 1953  5 Sheets-Sheet 1

INVENTOR.
VICTOR J. SIGODA
BY
J. J. Bobrow
ATTORNEY.

July 13, 1954   V. J. SIGODA   2,683,488
EMBROIDERY TRIMMING MACHINE
Filed Feb. 16, 1953   5 Sheets-Sheet 2
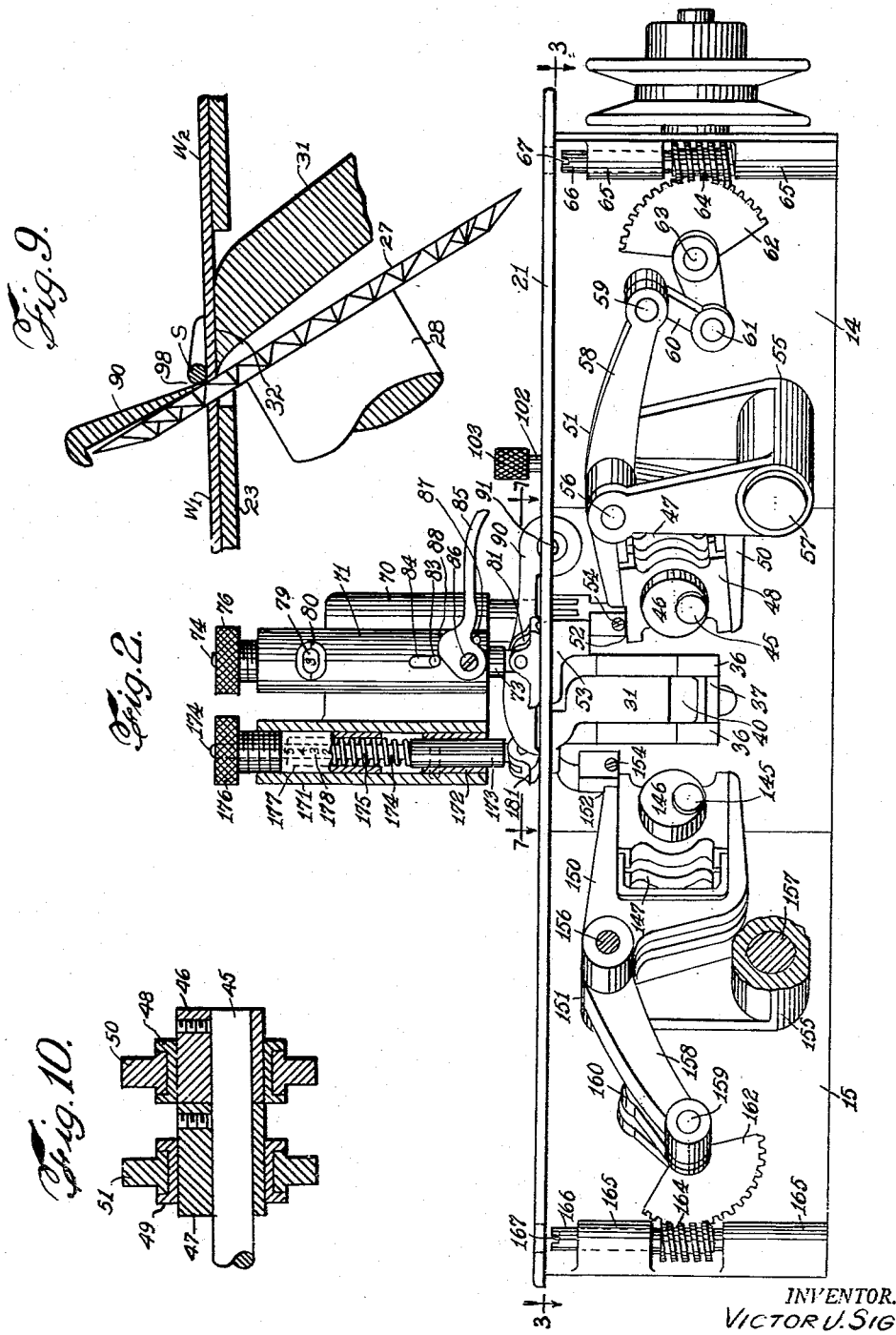
INVENTOR.
VICTOR J. SIGODA
BY
J. J. Bobrow
ATTORNEY.

July 13, 1954 V. J. SIGODA 2,683,488
EMBROIDERY TRIMMING MACHINE
Filed Feb. 16, 1953 5 Sheets-Sheet 3
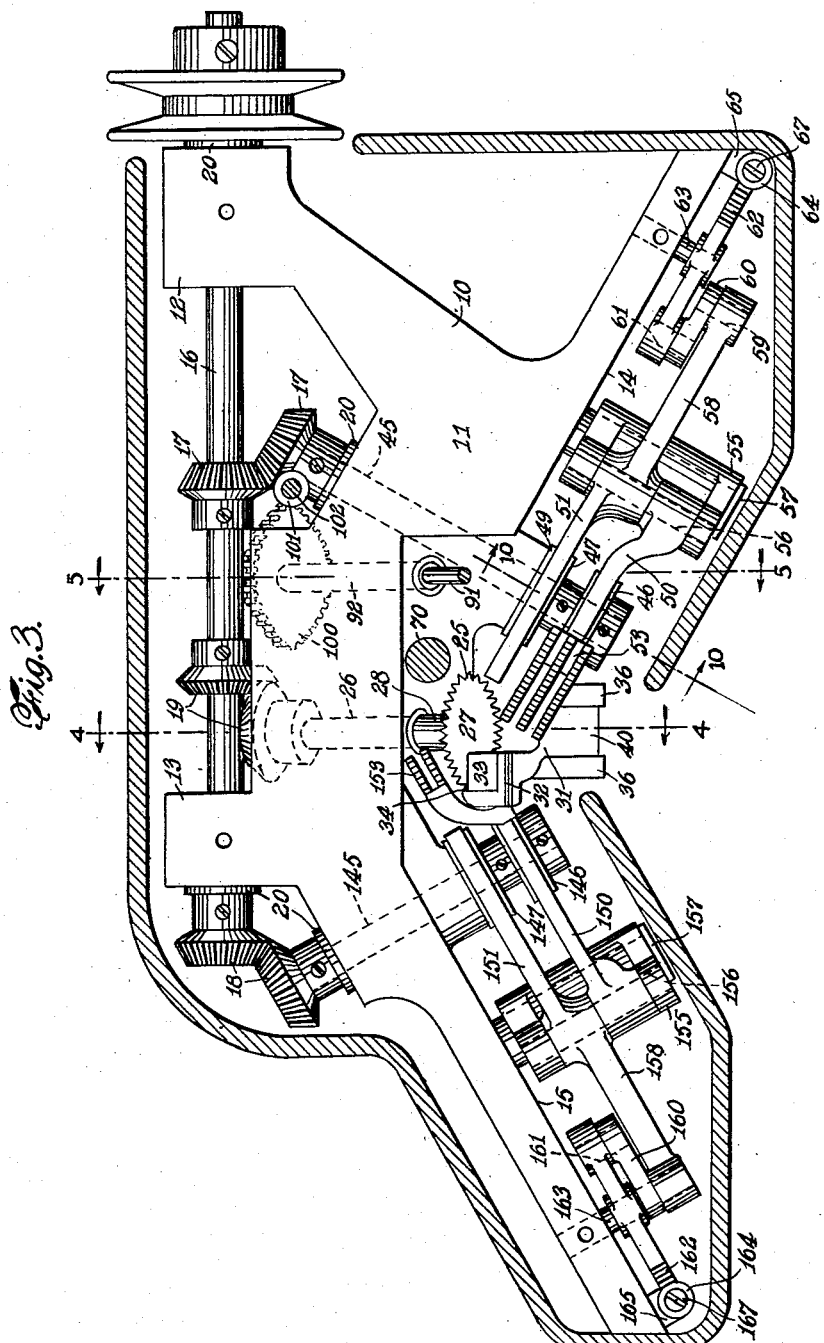
INVENTOR.
VICTOR U. SIGODA
BY
J. J. Bobrow
ATTORNEY.

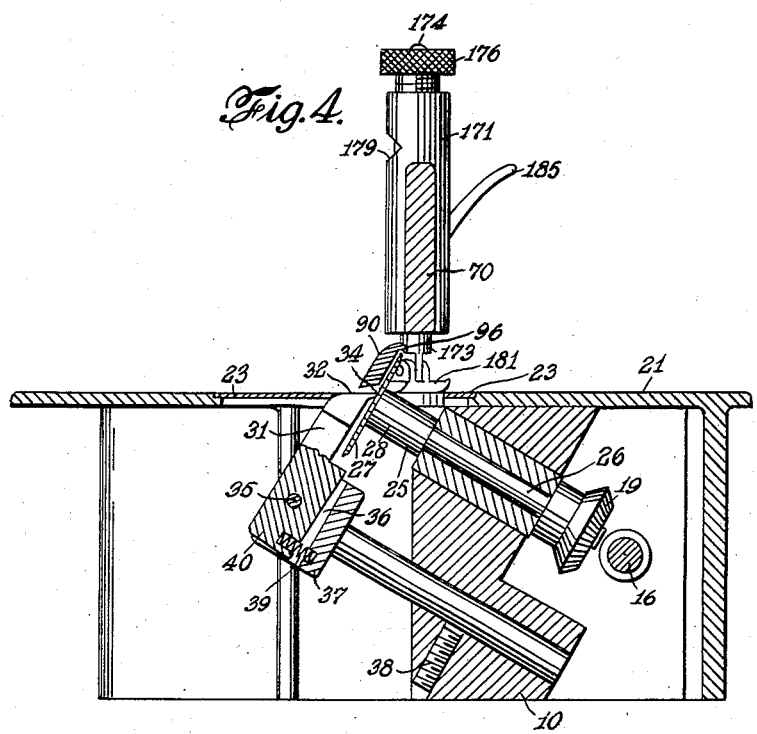

July 13, 1954 V. J. SIGODA 2,683,488
EMBROIDERY TRIMMING MACHINE
Filed Feb. 16, 1953 5 Sheets-Sheet 5
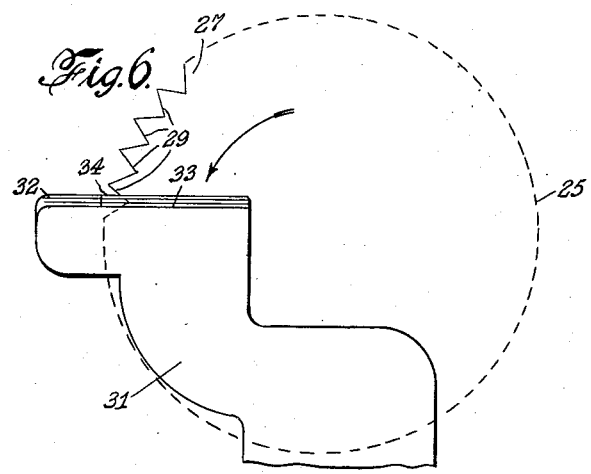
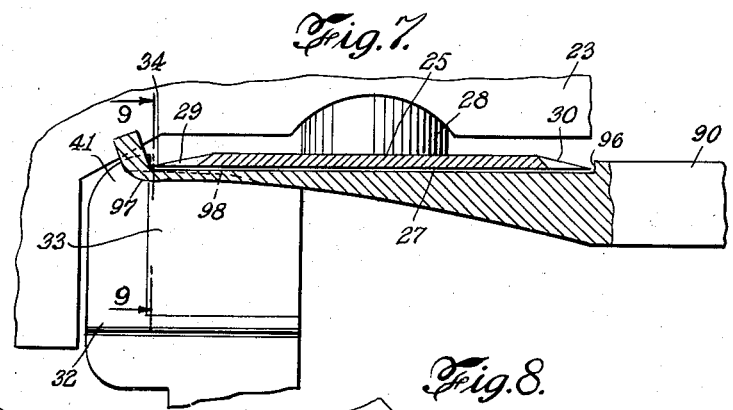
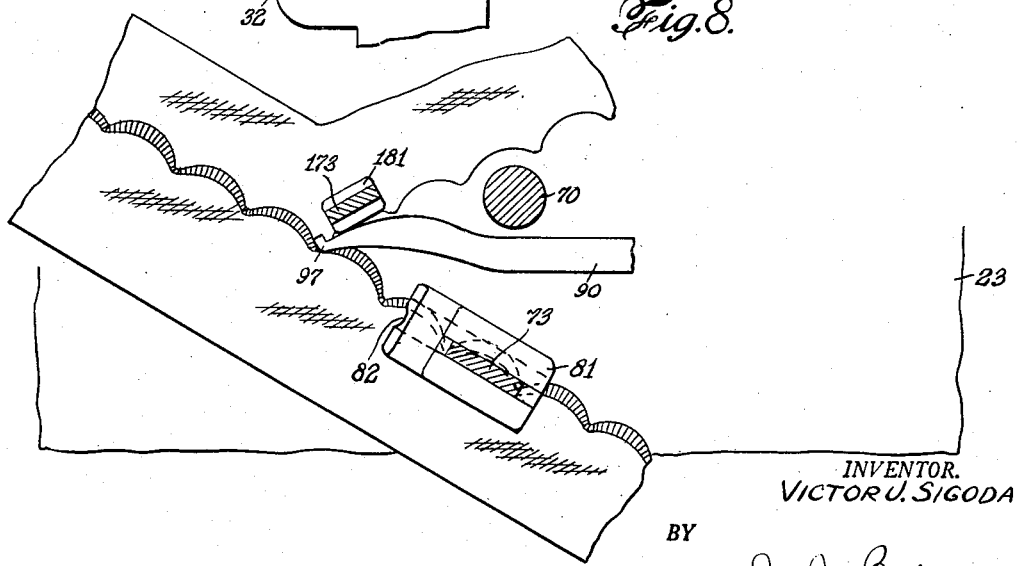
INVENTOR.
VICTOR J. SIGODA
BY
J. J. Bobrow
ATTORNEY.

Patented July 13, 1954

2,683,488

UNITED STATES PATENT OFFICE 2,683,488

EMBROIDERY TRIMMING MACHINE

Victor J. Sigoda, Great Neck, N. Y., assignor to Man-Sew Corporation, New York, N. Y., a corporation of New York Application February 16, 1953, Serial No. 336,918

19 Claims. (Cl. 164—62)

This invention relates to a machine to trim the excess or waste allowance from embroidered work in the nature of scalloping. This is a continuation-in-part of application Serial No. 82,206, filed March 18, 1949, now abandoned.

A large part of the embroidering trades devotes itself to applying scalloping to base materials. This consists of sewing ornamental threads, frequently over a filler cord or thread, to a fabric or a portion of a garment, such as a skirt, or a collar, in a pattern made up of a series of arcs joined together to form an undulating design. The excess or waste material is trimmed from the edge of the scallop, usually by hand. As these convolutions may be very intricate, cutting away the waste requires great skill and adeptness, and considerable patience with a tedious job. Necessarily, the rate of production is low, and the cost is therefore high, as damage can readily result if care is not diligently exercised.

A number of attempts have been made to develop mechanical means to accomplish what the skilled manipulation of the hand trimmer does. Some are in use, but still require considerable skill on the part of the machine operator. Such machines are effective only when cutting waste from long strip base materials, cut on what is known as the "straight," as, if any of the work, such as a collar, is cut on the "bias," it cannot be handled successfully.

This new machine therefore has as its main object to provide a reliable means of trimming this excess or waste material from scalloped embroidery work, or the like, regardless of size, shape or whether the embroidery is applied to "bias" or "straight" cut base fabrics.

More particular objects are:

(a) To provide novel means to advance the work to the cutting means in such manner that the machine is substantially self feeding, thereby minimizing the skill required of the operator.

(b) To provide a novel arrangement of the feed mechanisms and to so position them with respect to the cutting means that effective control is retained of the work regardless whether the base material is cut on the "straight" or "bias."

(c) To provide novel means of regulating the amount of feed of each of the co-operating feed mechanisms so that the requirements of any particular base material may be readily met.

(d) To provide calibrated means for adjusting the amount of relative slippage between the feed mechanisms and their respective co-operating presser shoes so that the requirement of any particular base fabric may be met, and readily reproduced, as required.

(e) To provide an improved embroidery sensing and deflecting means which enables the machine to distinguish between the raised embroidered and the flat unembroidered portions of the work, so that only the desired waste portion is offered to the cutting means for severance.

(f) To provide novel adjustable calibrated means so that the throat opening through which only the unembroidered flat portion of the work may pass to be cut off, can be uniformly regulated, and readily reset, to suit the particular requirements of the different thicknesses of the base fabrics or materials which may carry the embroidery; and thus to provide a very sensitive means of discriminating between the unembroidered waste portion and the embroidered portion of the work.

(g) To provide a novel means of mounting the various co-operating parts of the machine so that the excess or waste portion of the work to be severed may be presented so closely to the cutting means that no objectionable margin will remain around the edge after trimming, without damaging the embroidery.

Other objects and advantages of the invention will in part appear and in part be obvious from the following description of the present preferred embodiment, and of the various modifications thereof, taken in conjunction with the drawings, in which:

Fig. 2 is a front elevation corresponding to Fig. 1, partly in section, with part of the left feed mechanism broken away for clarity;

Fig. 3 is a plan view taken on line 3—3 of Fig. 2 with all the parts above, and the top plate, removed to show the relationship of the cutting means, the feeder and drive mechanisms;

Fig. 4 is a cross-sectional view taken on line 4—4 of Fig. 3 omitting the left feed mechanism, showing in detail the mounting and relationship of the cutter elements;

Fig. 5 is a cross-sectional view rearwardly of Fig. 4 on lines 5—5 of Fig. 3, omitting the feed mechanisms, showing in detail the means for adjusting the embroidery senser and deflector;

Fig. 6 is an enlarged detail view showing the shearing relationship of the multiple-toothed rotary shear blade and the cooperating stationary ledger blade;

Fig. 7 is a longitudinal section through the rotary shear blade and the embroidery senser and deflector taken on line 7—7 of Fig. 2;

Fig. 8 is a schematic plan view showing the operation of the embroidery deflector on the work, a portion thereof having been trimmed, the waste being directed rearwardly in one direction and the trimmed work in another by the divergent action of the dual feed mechanisms;

Figure 1:
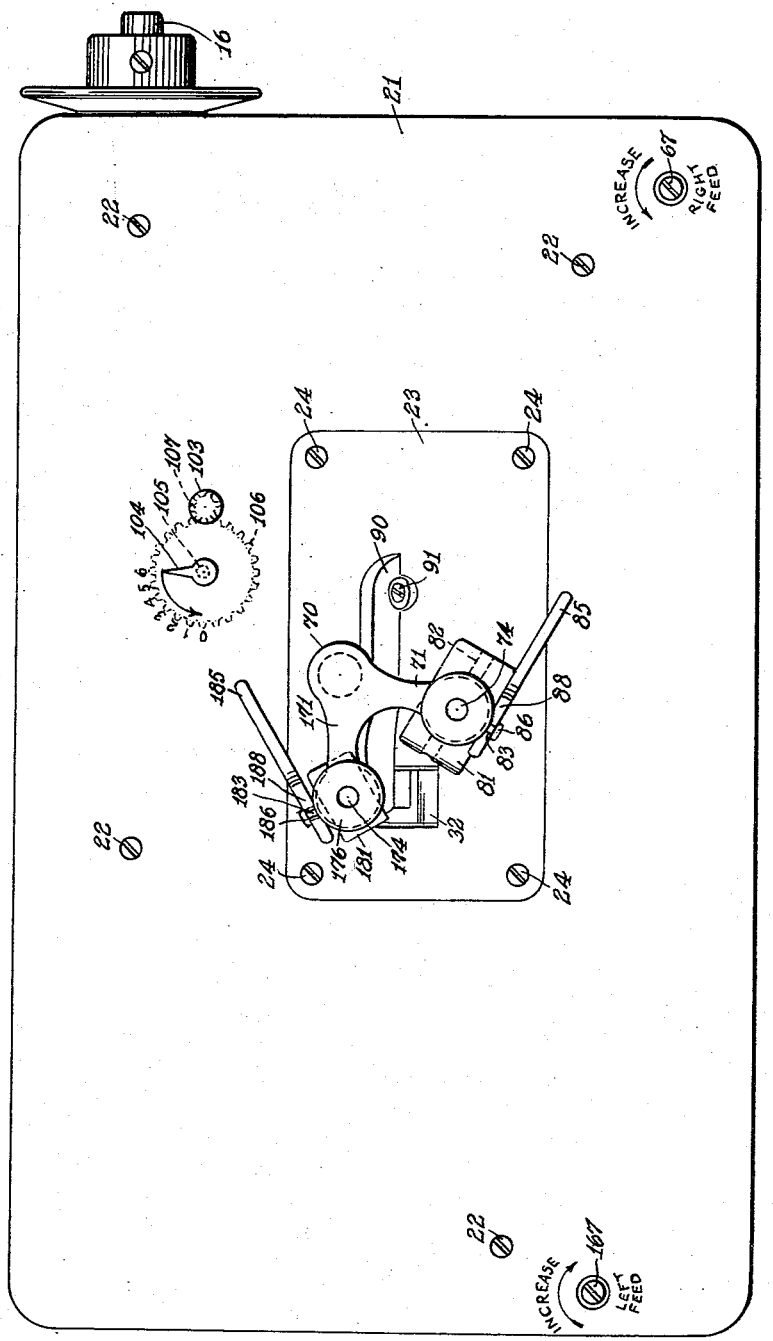
Fig. 1 is a plan view of the machine.

Fig. 9 is an enlarged cross-sectional view taken substantially on line 9—9 of Fig. 7 with a fragment of the embroidered work W being shown, illustrating in detail the cooperation between the deflector, the shear elements and the work, the latter being shown just after separation by the shear elements into the waste portion $W_1$ and portion $W_2$ on which a series of scallops S has been embroidered, the edge of which is trimmed by the machine; and Fig. 10 is a section taken on line 10—10 of Fig. 3 showing the relationship of the eccentrics, the slide blocks and the feed bar of one feed mechanism.

Referring to the drawings, and Fig. 3 initially, it will be seen that the machine comprises main bed casting 10 having top surface 11 and two arms 12 and 13 bored to receive bearings in which mainshaft 16 is furnished. Right and left feeder mechanisms mount respectively on inner vertical faces 14 and 15.

Mainshaft 16 is provided with three bevel gears for power takeoff. Bevel gear set 17 operates the right feeder mechanism; bevel gear set 18 operates the left feeder mechanism, and bevel gear set 19 operates the rotary shear member 25. Thrust washers 20 are used where required.

Mounted on surface 11 when the machine is assembled, as best shown in Fig. 1, is a work supporting plate 21, attached to bed 10 by means of screws 22. A rectangular opening is provided centrally in plate 21 to receive in flush relationship therewith, a hardened steel throat plate 23, held therein by means of screws 24. Operating through throat plate 23, are a cutting means and two separate feeder means. The cutting means which is the subject matter claimed in a companion continuation-in-part case S. N. 336,919 filed February 16, 1953 will first be described.

A rotary shear member 25 is mounted for rotation on its shaft 26 in a bore in bed 10. Although not shown, shaft 26 rotates in ball bearings for obvious reasons. Shaft 26 is driven by means of one of the bevel gears sets 19 at a suitable speed which may be selected by using appropriate ratios for such gears.

Shaft 26 is mounted at an oblique angle to pitch the multiple toothed shearing face 27 of rotary shear member 25 at an angle which facilitates co-operation with the embroidery senser and deflector 90, for the co-action which will be subsequently described. The hub portion 28 of shaft 26 serves as a spacer for the proper positioning of shear face 27 with respect to the other co-operating parts.

As best shown in Figs. 6 and 7, rotary shear member 25 is provided with a large number of peripheral shearing edges 29 on face 27, and with a suitable back clearance, as by a bevel 30.

Co-operating with rotary shear member 25 is a ledger blade 33. As best shown in Figs. 4 and 5, a ledger blade mounting lever 31 is provided with a top flat surface 32, in which a ledger blade 33 may be inset as by brazing, in which case a long wearing material such as tungsten carbide may be utilized as the stationary shearing edge 34. Lever 31 is pivotally mounted by a pin 35 retained in the arms 36 of a yoked support 37, which is suitably held by its shaft portion in a bore in bed 10, as by a set screw 38.

Shear edge 34 is resiliently urged against shear face 27 by means of a spring 39 bearing against the lower end 40 of ledger blade mounting lever 31. Spring 39 is retained in a socket in support 37.

The pivotal mounting of lever 31 is so arranged that the shear edge 34 overhangs the pivot pin 35, so that the downward drag exerted on the work by the rotation of rotary shear face 27 will always tend to bring the shear edges into closer engagement, making not only for more efficient shearing action, but also preventing the material from coming between and separating the shear edges and rendering them ineffective.

Referring to Fig. 6, it will be seen that the multiple rotary shear edges 29 are inclined at such an angle, that as face 27 rotates (in this instance downwardly), there will be sequential and progressive engagement of each shear edge 29 with the stationary shear edge 34, which is highly desirable.

Ledger blade mounting lever 31 has been shaped to permit necessary clearance for the other operating parts of the machine as shown, but it need not necessarily be of this particular shape, nor need it be mounted as shown. For example, if rotary shear member 25 were to rotate upwardly, it would be entirely feasible to apply the stationary shear edge to the embroidery senser and deflector 90 at 98, in which case, the opposite shear edges on shear face 27 would be utilized.

From what has been described so far, it will be readily apparent that any work which is passed over plate 21 to and over the throat plate 23 to the co-operating shear edges 29 and 34, will be severed by the shearing action thereof, as power is applied to the machine. To better support this work for this severing action, and to prevent any part of it from being drawn downwardly by the rotation of shear face 27, top surface 32 of ledger blade mounting lever 31 lies substantially flush with throat plate 23, and partially surrounds the rotary shear face 27, with suitable clearance at the nose portion 41 thereof to prevent interference with the shear edges 29.

As will be noted in Fig. 7, however, throat plate 23 does not abut the back of shear face 27, but instead, there is considerable clearance, which it is found permits any waste which might become wedged between the edge of throat plate 23 and the back of shear face 27, to be pulled out by the action of the left hand feed mechanism.

The means for automatically advancing the work to the severing means consists generally of two independent feeder mechanisms whose coaction may be varied so as to provide suitable feed motions to transport the work to the severing means in a manner which will effectively sever the waste or excess material from the edge of the embroidery, but will not result in injury to the latter.

As seen in Figs. 2 and 3, there is a right mechanism and a left mechanism. As both are similar in structure and action, only the right feeder mechanism will be described as illustrative of both, it being understood that suitable reversal of the parts will be necessary to obtain the left feeder action. Corresponding parts of each mechanism bear related numbers, the left mechanism parts being numbered 100 higher than those of the right.

As best shown in Fig. 3, it will be noted that each mechanism is driven from mainshaft 16 by means of bevel gear sets 17 and 18 respectively. Two drive shafts 45 and 145 are journalled in bed 10, and inclined at a suitable angle to each other. The operating portions of such shafts extend respectively through faces 14 and 15 of bed 10.

Referring now only to the right feeder mechanism, drive shaft 45 is provided with two eccentrics 46 and 47 which provide the desired four motion action of the feed dog 53, through a linkage which will now be described.

This four motion action is made up of a lift or vertical component and a feed or horizontal component, suitably combined to advance the work intermittently from the cutting members after the severing action. The lift component is derived from the rotation of eccentric 46 in lift bar 50. To minimize the wear that would result from such rotation of the eccentric 46 in the slotted portion of bar 50, eccentric 46 rotates in a flanged slide block 48, through which the lift oscillating motion of lift bar 50 is effectively derived. Lift bar 50 is milled at 52 so that feed dog 53 may be mounted thereon, as by a screw 54. Lift bar 50 is pivotally mounted on a rocking yoke 55 by means of pin 56.

It will be seen that the feed dog 53 will be alternately lifted and lowered on an arcuate path about pivot pin 56. If pivot pin 56 were to oscillate in an arcuate path about pin 57 which mounts rocking yoke 55 on face 14 of bed 10, then the resultants of such arcuate motions in properly timed relationship would bring about the desired four motion feed action. It would also follow that if the extent of rocking of yoke 55 were varied, then the length of feed stroke of feed dog 53 would also vary.

The means for rocking yoke 55 and for selecting the amount of such rocking will now be described. Eccentric 47 rotates in slide block 49 in a slot in feed bar 51, which is also pivotally mounted on pin 56 in yoke 55. Feed bar 51 has an extension arm 58 which carries a pin 59, on which a link 60 is pivotally mounted. The other end of link 60 connects by means of pivot pin 61 with a segment gear lever 62, which is pivotally mounted on face 14 by means of pin 63. Lever 62 mates with worm 64, mounted in ears 65 on face 14, on a wormshaft 66, having a slotted end 67.

For any given position of lever 62, which it is apparent is adjusted by turning worm 64 by means of a screwdriver in the slotted end 67, pivot pin 61 will be held in a locked position on an arc about pin 63. For any such locked position, link 60 will be oscillatable about pin 61. However, the point about which link 60 can rock will depend upon any adjustment of the worm 64.

Since link 60 and arm 58 are connected by pivot pin 59, as oscillating motion is applied by eccentric 47 to the slotted end of feed bar 51, the resultant will be an oscillation of pin 56 as yoke 55 rocks in the arcuate path about pin 57 mentioned previously. The amplitude of this rocking of pin 56 about pin 57 will depend upon the position of pin 61 on the arc about pin 63 on which it may be adjusted by setting of the worm 64.

Hence as lever 62 is adjusted from one extreme to the other, and the position of pin 61 is varied thereby, the amplitude of rocking of pin 56 will be varied resulting in a variation from a maximum feed stroke to a minimum feed stroke.

In Figs. 2 and 3, the positions of adjustment of levers 62 and 162 have been shown so that the right hand feed mechanism is set for maximum feed stroke, while the left hand feed mechanism is set for minimum feed stroke. Obviously, any desired stroke between these limits may be selected for either feed mechanism by appropriate turning of wormshafts 66 and 166. For this purpose plate 21 has openings on either side thereof (see Fig. 1) through which a screwdriver may be inserted to engage the slotted ends 67 and 167 for such adjustment. Suitable legends appear about such openings to indicate in which direction the respective worm is to be turned to obtain the desired feed stroke.

The feed stroke of each feed mechanism is therefore independent, and readily adjustable as required.

Co-operating with each feed mechanism is a presser foot assembly. These are likewise readily and independently adjustable to meet the requirements of any particular base material.

The right and left presser foot assemblies are best shown in Fig. 2. Presser feet support bracket 70 is vertically mounted in a bore in bed 10. Bracket 70 has a right arm 71 and a left arm 171. Since the structure and action of each of the presser foot assemblies is substantially the same, related parts bear similar numbers, those of the left presser foot assembly being 100 higher. Only the left presser foot assembly which can be seen best in Fig. 2, will be described as illustrative of both.

Left presser foot assembly arm 171 has a central bore which is bushed at 172 to receive a presser foot bar 173. Presser foot bar 173 may be of reduced cross-section at its upper portion, as at 174, about which a tension compression spring 175 may be mounted to provide downward pressure. Bar 173 may pass through a spring tension adjusting screw 176 which is adjustably threaded into the top portion of arm 171. The lower end of screw 176 bears on a cylindrical cap member 177 which surrounds spring 175, having its top end suitably flanged to bear on the top end of spring 175, in such manner, that as screw 176 is screwed downwardly, tension is increased. As it is desirable to be able to reproduce a particular tension which experience shows is most suitable for any particular base material, a means for calibrating such tension has been provided.

This consists of markings 178 on the outer surface of cap 177, which may be viewed through a window 179 in arm 171 and 79 in arm 71. As screw 176 is threaded into arm 171, these markings pass a calibrating line 180 at either side of window 179, through which the particular tension may be noted.

Attached to the lower end of presser foot bar 173 is a hinged presser shoe 181, suitably shaped to co-operate with the toothed top surface of feed dog 153.

In the lower surface of right shoe 81, a groove 82 may be provided to allow the embroidery to pass therethrough. The purpose of this is to prevent loss of control over that portion of the base material about the embroidery which must be fed away from the cutting means after the waste has been severed. It is evident that if such groove 82 were not provided, the raised embroidery could lift shoe 81, thus losing complete engagement of the teeth of the feed dog 53 with the work, and control of the right feed movement.

As it is desirable to raise the presser shoes for the insertion of their respective fabric portions between them and the co-operating feed dogs so that such sections may be respectively transported following their severance, means have been provided in each of the arms 71 and 171 to permit the presser bars 73 and 173 to be raised in the conventional manner.

A lift pin 83 attached to right presser bar 73, extends through a vertical slot 84 in arm 71 to be engaged by a presser bar lifter 85, which is pivotally mounted on a shouldered screw 86 threaded into arm 71. A stop pin 87 is provided to hold lifter 85 in its idle position, above the level of the work. It will be seen that as the end of lifter 85 is raised, the cam surface 88 thereof will raise pin 83, and hence bar 73, against the compression of spring 75. As a part of this cam surface 88 is suitably shaped to provide a locking position, it will be seen that lifter bar 73 may be retained in raised position thereby, as desired.

The action of the presser feet in conjunction with the feed dogs is well known. The combined feeding actions will be subsequently described in conjunction with the action of the cutting means, and of the embroidery sensing and deflecting means which remains to be described.

An embroidery senser or feeler and deflector 90 is adjustably mounted on an eccentric portion 91 of a shaft 92 which is obliquely mounted and which may be turned in a bore in bed 10. Deflector 90 has a hub portion 93 in which eccentric shaft portion 91 is received and held in adjusted position, as by a set screw 94.

The adjustment of the deflector 90 off center of shaft 92 is made by loosening set screw 94 and turning knurled head 103 of wormshaft 102 in the required direction and then retightening set screw 94 in the adjusted position. This permits deflector 90 to be positioned forwardly or rearwardly of shear edges 29 as required to provide suitable clearance in the recess 96 in the back face of deflector 90 for the shear face 27. When rotary shear member 25 is resharpened, its diameter will be reduced, and the adjustment mentioned will permit optimum positioning.

The nose section 97 of deflector 90 is shaped, as best shown in Figs. 7 and 8, to assist in deflecting the embroidery from the cutting means, but to allow the waste to be cut away as shown in Fig. 8. It is desirable to trim as closely to the edge of the embroidery as possible, without actually cutting the latter. For this purpose, deflector 90 has been thinned at 98 to permit the scallop edge to come right up to the shear face 27, but to be separated therefrom sufficiently to prevent damage. The oblique mounting of rotary shear member 25 previously mentioned, actually permits the shear edges 29 to project slightly under the applied embroidery S as the work is severed. The deflector 90 thus has no apparent thickness at 98, although the vertical wall thereof will be in contact with the raised embroidery to keep it from being cut by the rotary shear member 25. Thus the waste is cut away right up to the edge of the scallop.

Contributing to this arrangement is the fact that deflector 90 rests above ledger blade 33 with just sufficient clearance to form a throat through which only the base material may pass. It is desirable to make this throat adjustable, first to accommodate different thicknesses of different base materials, and secondly to permit the throat to be opened for the insertion of the work.

This is accomplished by means of a worm gear 100 fixed on the lower end of shaft 92, which is engaged by worm 101, mounted on a shaft 102, one end of which extends through plate 21, and has a knurled head 103 for adjustment of the deflector 90. To permit accurate resetting of the throat opening for any given base material, a calibration means is provided, consisting of an indicating pointer 104 mounted on a shaft 105 carrying a large spur gear 106. A small spur gear 107 on shaft 102 will cause the pointer 104 to be rotated adjacent a suitable scale on the surface of plate 21, when the knurled head 103 is adjusted. Hence for any given adjustment there will be a given scale indication which may readily be reproduced. The choice of the gears 106 and 107 has been dictated in this instance by a desire to amplify the readings for fine adjustment. Obviously, a choice of any suitable ratio will provide the degree of amplification desired.

Of course the means to adjust the throat opening and of calibrating it as shown and described herein are merely illustrative, as there are many other means available for accomplishing the same result.

Having described the structure of the various co-operating parts of the machine, their co-action in operation to perform the desired separation will now be explained.

Referring to Fig. 8, it will be seen that the work consists of a series of scallops embroidered on a base material. When power is applied to the pulley, the rotary shear member 25 will begin to turn, and the right and left feeders will begin to feed rearwardly. The waste portion and the scalloped portion may be initially separated as shown in Fig. 8 by hand using scissors, or the operator may feed the work to the cutting means until sufficient separation has been obtained to permit the waste portion to be placed beneath the left presser shoe, and the scalloped portion under the right presser shoe. To permit this initial cutting, the deflector 90 may have to be raised by manipulation of the knurled head 103 so that the throat clearance is wide enough for this purpose. The throat opening is adjusted so that only the base material may pass therethrough.

Lifter 185 is then raised so that the waste portion may be inserted between the left shoe and feed dog, and lowered, making the left feed effective. Lifter 85 is then raised and the embroidered portion inserted between the right shoe and feed dog, the scallops being centered in the groove 82 as shown in Fig. 8. Lifter 85 is lowered and the right feed then becomes effective.

The tensions on each presser shoe are then respectively adjusted so that the work portions may be fed rearwardly, but so that enough slippage between the shoes and feed dogs will be permitted so that each feed may become momentarily less effective if the respective work portions are retarded.

Both feed means will now begin to advance the respective portions of the work piece rearwardly, the right feed drawing the embroidered portion off to the right, and the left feed drawing the waste portion off to the left.

Assuming that the edge of any of the scallops is now spaced to the right of the deflector 90, the left feed will draw the work piece to the left until some portion of the nose 97 of deflector 90 comes in contact with the raised embroidery, at which time the movement to the left will be momentarily halted, the left feed having become momentarily ineffective because the raised embroidery cannot pass through the throat opening.

The right feed means will still be effective, and will continue to draw the work rearwardly and to the right. As soon as this results in the scallop being spaced from the deflector 90, the left feed will again become effective, and draw the work over again until it comes into contact with the deflector.

This combination of feed movements will ultimately result in the entire undulation of the scallops coming into contact with some portion of the nose 97 as the work piece travels rearwardly to the right. To accomplish this, the respective feed strokes of the right and left feeders, and their timing may have to be adjusted to obtain a proper balance of these respective motions to bring about the desired result, when the machine will become self feeding.

The effect of this resultant of feed movements on the work piece will be to present the edge of the scallop to the shearing means. The rotary shear member makes a multitude of short scissors-like cuts in the base material adjacent the edge of the embroidery, as the latter is supported by the stationary shear member. As deflector 90 is of reduced cross section at 98, which is in the immediate vicinity of the cutting action, and as the cutting action actually extends under the deflector at this point due to the pitch of the rotary shear face 27, the result will be a series of cuts in such close proximity to the edge of the embroidery that no objectionable margin will be left.

Nose piece 97 has been shaped to permit the corners of the scallops shown in Fig. 8 to be effectively trimmed. If other shapes of scallops having very sharp corners are to be trimmed, it is understood that the nose portion 97 may be adapted accordingly.

The particular cutter means shown and described is desirable because it makes a multitude of short scissors-like cuts, which is very effective for the purpose. However, other cutter means could be readily substituted as long as relatively short cutting action results so that the undulations may be properly trimmed as the deflector senses the intricate configuration of the embroidery.

The positioning of the respective feed means in the immediate vicinity of the cutting action, as shown and described results in complete control of the work, regardless whether the base material is cut on the "straight" or on the "bias." This overcomes the disadvantages of previous efforts to solve this problem. Such positioning enables the machine to be used to trim collars and cuffs, which is beyond the capabilities of previous machines.

The invention therefore provides a versatile machine capable of operating on a wide variety of embroidery work with great rapidity and accuracy.

While the presntly preferred embodiment of the invention has been described in detail for the purpose of illustration, it is to be understood that the invention is not limited to the details of the construction shown and described, but it is to be construed broadly within the purview of the claims.

What is claimed is:

1. In a machine for separating the waste portion of a fabric work base having raised embroidery applied thereto provided with severing means, means to deflect the embroidered edge from the severing means and dual feed means to transport the work to the severing and deflecting means, each of said feed means being respectively mounted on opposite sides of and closely adjacent to the severing action, the arrangement in which each of said feed means comprises a resiliently mounted member and means whereby the degree of tension applied to such member may be adjusted to allow slippage of a portion of the fabric base in its respective feed mechanism when the raised edge of the embroidery comes into abutment with the deflecting means so that either feed mechanism is only effective to draw the work in one direction until the raised edge of the embroidery comes into abutment with the deflecting means at which time the other feed mechanism is effective to draw the work in another direction angularly divergent from the first direction, the resultants of said feed movements and of said slippage being to continually bring the raised edge of the embroidery into abutment with said deflector to prevent said embroidery from being acted upon by the severing means as the waste portion of the base fabric is cut away.

2. In a machine for severing the waste allowance from embroidered work having a severing means, an embroidery deflector, and means to feed the embroidered portion thereof against and along the said deflector and the unembroidered portion thereof under said deflector for the severance of the latter by the severing means: dual feed mechanisms having means connected thereto to adjust selectively the magnitude and timing of feed of each in relation to the other, so that the direction of said feed movements, the selected magnitudes thereof, and the relative timing thereof, form polygons of force whose resultants are continually in a direction toward the deflector.

3. In a machine to trim waste fabric from embroidered work along a raised edge thereof, severing means including a rotatable shear member, means to deflect the embroidered edge from the severing action, and dual feed means to transport the work to the severing and deflecting means, each of said feed means being respectively mounted on opposite sides of, closely adjacent to and between the severing action and the axis of rotation thereof, said feed means also being disposed at divergent angles to each other and to the general feed path of the work in the plane in which the work is transported and arranged to draw severed portions of the work in separate paths angularly divergent with respect to each other in said plane.

4. In a machine to trim waste fabric from embroidered work along a raised edge thereof, severing means comprising a rotatable shear blade obliquely disposed with reference to the plane of transport of the work and a cooperating stationary shear member pivotally mounted in abutting relationship therewith, means to deflect the embroidered edge from the severing action, and dual feed means to transport the work to the severing and deflecting means, each of said feed means being respectively mounted on opposite sides of, closely adjacent to, and between the severing action and the axis of rotation thereof, said feed means also being disposed at divergent angles to each other and to the general feed path of the work in the plane in which the work is transported and arranged to draw severed portions of the work in separate paths angularly divergent with respect to each other in said plane.

5. In a machine to trim waste fabric from embroidered work along a raised edge thereof, severing means comprising a rotatable shear blade obliquely disposed with reference to the plane of transport of the work and a cooperating stationary shear member pivotally mounted in abutting relationship therewith, said pivotal mounting being parallel to, below and spaced from a plane normal to the axis of rotation of the rotatable cutter and disposed so that the stationary shear edge overhangs the pivotal mounting whereby the downward drag exerted on the work by the rotation of the rotatable shear member tends to bring the shear edges into closer engagement, means to deflect the embroidered edge from the severing action, and dual feed means to transport the work to the severing and deflecting means, each of said feed means being respectively mounted on opposite sides of, closely adjacent to, and between the severing action and the axis of rotation thereof, said feed means also being disposed at divergent angles to each other and to the general feed path of the work in the plane in which the work is transported and arranged to draw severed portions of the work in separate paths angularly divergent with respect to each other in said plane.

6. In a machine to trim waste fabric from embroidered work along a raised edge thereof, severing means comprising a rotatable shear blade obliquely disposed with reference to the plane of transport of the work, a cooperating stationary shear member pivotally mounted in abutting relationship therewith so disposed that the stationary shear edge overhangs said pivotal mounting, and resilient means to normally urge said cutting members into abutting relation and to resist the separation thereof, means to deflect the embroidered edge from the severing action, and dual feed means to transport the work to the severing and deflecting means, each of said feed means being respectively mounted on opposite sides of, closely adjacent to, and between the severing action and the axis of rotation thereof, said feed means also being disposed at divergent angles to each other and to the general feed path of the work in the plane in which the work is transported and arranged to draw severed portions of the work in separate paths angularly divergent with respect to each other in said plane.

7. In a machine to trim waste fabric from embroidered work along a raised edge thereof, severing means comprising a rotatable shear blade and a cooperating stationary shear member pivotally mounted in abutting relationship therewith, said rotatable shear blade being provided with a plurality of shear edges each of which is adapted to cooperate with the stationary shear member so that the respective shear edges are progressively engaged in the manner of scissors blades, said severing means being mounted to make a series of small scissors-like cuts longitudinally along the general path of transport of the work, means to deflect the embroidered edge from the severing action, and dual feed means to transport the work to the severing and deflecting means, each of said feed means being respectively mounted on opposite sides of, closely adjacent to, and between the severing action and the axis of rotation thereof, said feed means also being disposed at divergent angles to each other and to the general feed path of the work in the plane in which the work is transported and arranged to draw severed portions of the work in separate paths angularly divergent with respect to each other in said plane.

8. In a machine to trim waste fabric from embroidered work along a raised edge thereof, severing means comprising a rotatable shear blade obliquely disposed with reference to the plane of transport of the work and having a plurality of shear edges, means to deflect the embroidered edge from the severing action including a member having one portion adapted to deflect the raised embroidery edge and another portion adapted to cooperate with the rotatable shear edges as a stationary shear blade to make a series of small, scissors-like cuts longitudinally along the general path of transport of the work, and dual feed means to transport the work to the severing and deflecting means, each of said feed means being respectively mounted on opposite sides of, closely adjacent to, and between the severing action and the axis of rotation thereof, said feed means also being disposed at divergent angles to each other and to the general feed path of the work in the plane in which the work is transported and arranged to draw severed portions of the work in separate paths angularly divergent with respect to each other in said plane.

9. In a machine to trim waste fabric from embroidered work along a raised edge thereof, severing means, means to deflect the embroidered edge from the severing action including a member mounted in the vicinity of the severing action adapted to form a throat opening with a surface portion of one member of the severing means and means for obtaining a relatively fine adjustment of said throat opening and for indicating the extent thereof to permit duplication of any desired spacing, and dual feed means to transport the work to the severing and deflecting means, each of said feed means being respectively mounted on opposite sides of, closely adjacent to, and between the severing action and the axis of rotation thereof, said feed means also being disposed at divergent angles to each other and to the general feed path of the work in the plane in which the work is transported and arranged to draw severed portions of the work in separate paths angularly divergent with respect to each other in said plane.

10. In a machine to trim waste fabric from embroidered work along a raised edge thereof, severing means, means to deflect the embroidered edge from the severing action including a member mounted in the vicinity of the severing action adapted to form a throat opening with a surface portion of one member of the severing means and means for obtaining a relatively fine adjustment of said throat opening and for indicating the extent thereof to permit duplication of any desired spacing comprising a rotatably mounted shaft on which said deflecting member is mounted, a gear carried by said shaft, a mating gear, a second shaft on which the mating gear is mounted, said second shaft having an externally manipulatable portion to effect the adjustment of the throat opening, a third gear mounted on said manipulatable shaft, a larger gear mating therewith, a shaft on which said gear is mounted, and an indicating means attached to said shaft whereby relatively small rotation of said manipulatable shaft produces relatively large changes in said indicating means, and dual feed means to transport the work to the severing and deflecting means, each of said feed means being respectively mounted on opposite sides of, closely adjacent to, and between the severing action and the axis of rotation thereof, said feed means also being disposed at divergent angles to each other and to the general feed path of the work in the plane in which the work is transported and arranged to draw severed portions of the work in separate paths angularly divergent with respect to each other in said plane.

11. In a machine to trim the waste fabric allowance along an embroidered edge, severing means including a rotatable shear member, means adjacent the severing means to deflect the embroidered edge from the severing action, and dual feed means to transport the work, each of said feed means being respectively mounted on opposite sides of, closely adjacent to and between the severing action and the axis of rotation thereof, each of said feed means comprising a presser member mounted above the plane of transport of the work, a cooperating feed member mounted below said plane and operable therethrough, and operating means to raise each feed member through said plane and into resilient engagement with its cooperating presser member and to move each feed member longitudinally in a path in said plane in a direction away from the severing action and at an angle to the general path of movement of the work.

12. In a machine to trim the waste fabric allowance along an embroidered edge having a work supporting surface, severing means including a rotatable shear member, means adjacent the severing means to deflect the embroidered edge from the severing action and dual feed means to transport the work across said surface to and from the severing and deflecting means, wherein said feed means are disposed on either side of, closely adjacent to and between the severing action and the axis of rotation thereof and arranged to draw severed portions of the work in separate paths angularly divergent with respect to each other in the plane of transport of the work, and wherein each of said feed means comprises a presser member above the work surface, a cooperating feed member mounted below the work surface and operable therethrough, and operating means.

13. A machine in accordance with claim 12 wherein each presser member is resiliently mounted, and wherein the degree of tension applied to such member may be adjusted to provide a selected amount of slippage of the work between the bottom of said presser member and the feed member, together with means to indicate and calibrate said tension for duplication thereof.

14. In a machine to trim the waste fabric allowance along an embroidered edge, having a work supporting surface, severing means, means adjacent the severing means to deflect the embroidered edge from the severing action and dual feed means to transport the work across said surface to and from the severing and deflecting means, wherein said feed means are disposed on either side of and closely adjacent the severing action and operable to draw portions of the work in separate paths angularly divergent with respect to each other in the plane of transport of the work, and wherein each of said feed means comprises a presser member above the work surface, a cooperating feed member mounted below the work surface and operable therethrough, and operating means to raise said feed members intermittently through and above the work surface and to move said feed members bodily while in the raised position in a direction away from the severing action, together with means to regulate the amount of movement away from the severing means.

15. A machine in accordance with claim 14, wherein each means to operate the feed members comprises an operating shaft, an eccentric mounted thereon, a lift bar carrying the feed member operable from said eccentric, a second eccentric mounted on said shaft, a feed bar operable from said second eccentric, a rockable member on which the lift and feed bars are pivotally mounted, a link connected to the feed bar, a pivotally mounted member, one end of said link being connected thereto for rocking action about said connection, and means to adjust said member about its pivot.

16. A machine in accordance with claim 15, wherein the means to adjust the position of the pivotally mounted member comprises a gear segment portion on said member, a worm in engagement therewith, and a shaft on which the worm is mounted, said shaft being adapted to be turned to move said pivotally mounted member about its axis.

17. In a machine to trim the waste fabric allowance along an embroidered edge having severing means, means adjacent the severing means to deflect the embroidered edge from the severing action, and dual feed means to transport the work, said feed means being disposed on either side of and closely adjacent the severing action and operable to draw portions of the work in separate paths angularly divergent with respect to each other in the plane of transport of the work, and wherein each of the feed means is independently adjustable of the other to regulate the relative amount of feed action of one with respect to the other.

18. A machine in accordance with claim 17, wherein means are provided to adjust the timing of one feed means with respect to the other.

19. In a machine to trim the waste fabric allowance along an embroidered edge having severing means including a rotatable shear member, means adjacent the severing means to deflect the embroidered edge from the severing action, and dual feed means, one of which is effective to transport the waste portion, and the other is effective to transport the trimmed work away from the severing action, said respective portions being drawn in separate paths angularly divergent with respect to each other in the plane of transport of the work and waste portions, and wherein the feed means which acts on the waste portion is positioned between the point at which the severing action is effective and the axis of rotation of the rotatable shear member.

No references cited.